United States Patent
Wheeler, Jr. et al.

(10) Patent No.: US 7,267,288 B2
(45) Date of Patent: Sep. 11, 2007

(54) POLYURETHANE IN INTIMATE CONTACT WITH FIBROUS MATERIAL

(75) Inventors: Henry H. Wheeler, Jr., Long Beach, CA (US); Corland Crandal, Huntington Beach, CA (US); Hugh Wheeler, III, Apple Valley, CA (US)

(73) Assignee: Nevada Supply Corporation, Costa Mesa, CA (US)

( * ) Notice: Subject to any disclaimer, the term of this patent is extended or adjusted under 35 U.S.C. 154(b) by 0 days.

(21) Appl. No.: 09/814,552

(22) Filed: Mar. 22, 2001

(65) Prior Publication Data
US 2002/0137871 A1 Sep. 26, 2002

(51) Int. Cl.
- B05B 1/28 (2006.01)
- B05B 1/00 (2006.01)
- B05B 1/32 (2006.01)

(52) U.S. Cl. .............. 239/398; 222/566; 222/571; 239/303; 239/407; 239/408; 239/410; 239/413; 239/414; 239/416.2; 239/416.3

(58) Field of Classification Search ........... 222/566, 222/571; 239/303, 398, 407, 408, 410, 413, 239/414, 416.2, 416.3; 156/60, 77, 78, 87; 428/297.4, 300.1, 300.7, 308.4, 314.4, 314.8, 428/316.6, 317.9, 317.1, 319.3, 319.7, 332, 428/423.1, 423.3; 521/137, 155; 523/200, 523/205, 206; 524/789, 847, 871; 528/48; 525/123, 130, 424, 453, 454, 455; 427/372.2, 427/373, 385.5, 421, 426
See application file for complete search history.

(56) References Cited

U.S. PATENT DOCUMENTS

| | | | | |
|---|---|---|---|---|
| 3,690,557 A | * | 9/1972 | Higgins | 239/112 |
| 3,837,575 A | * | 9/1974 | Lehnert | 239/112 |
| 4,034,138 A | | 7/1977 | Babayan | 428/378 |
| 4,095,404 A | | 6/1978 | Babayan | 57/164 |
| 4,096,997 A | * | 6/1978 | Larson | 239/413 |
| 4,121,619 A | * | 10/1978 | Pauliukonis | 137/469 |
| 4,369,285 A | | 1/1983 | Sanderson et al. | 524/538 |
| 4,378,403 A | | 3/1983 | Kotcharian | 428/251 |
| 4,415,693 A | | 11/1983 | Chen et al. | 524/198 |
| 4,424,316 A | | 1/1984 | DiSalvo et al. | 525/528 |
| 4,448,936 A | | 5/1984 | Wang et al. | 525/424 |
| 4,477,619 A | | 10/1984 | Lattimer et al. | 524/171 |
| 4,570,669 A | * | 2/1986 | Pauliukonis | 137/528 |
| 4,599,401 A | | 7/1986 | Koleske | 528/408 |
| 4,629,779 A | | 12/1986 | Koleske | 528/408 |
| 4,707,535 A | | 11/1987 | Koleske | 528/110 |

(Continued)

FOREIGN PATENT DOCUMENTS

JP 53034884 3/1978

Primary Examiner—Rabon Sergent
(74) Attorney, Agent, or Firm—Berliner & Associates

(57) ABSTRACT

A sprayable polymeric material and a process for preparing the material which contains a fibrous material, dispersed throughout the polymeric material. A restriction free spray nozzle is provided for mixing and spraying the polymeric material having a fibrous material, the nozzle having a restriction free check valve. A reinforced structure, and a method of making the structure are provided, the structure having layers of the polymeric material (both film and foam) containing the fibrous material. A flexible liner is provided of a porous geotextile fabric and a polyurethane composition comprising the fibrous material sprayed over the geotextile fabric.

4 Claims, 3 Drawing Sheets

U.S. PATENT DOCUMENTS

| | | | |
|---|---|---|---|
| 4,724,173 A | 2/1988 | Rockett et al. | 427/389.8 |
| 4,725,653 A | 2/1988 | Koleske | 525/510 |
| 4,844,955 A * | 7/1989 | Graefe et al. | 428/420 |
| 4,857,569 A | 8/1989 | Cotts et al. | 524/104 |
| 4,857,579 A * | 8/1989 | Domeier | 524/507 |
| 4,860,916 A * | 8/1989 | Winters | 220/4.33 |
| 4,956,397 A | 9/1990 | Rogowski et al. | 523/138 |
| 4,960,349 A * | 10/1990 | Willibey et al. | 405/262 |
| 4,999,147 A * | 3/1991 | Kojima et al. | 264/139 |
| 5,002,637 A | 3/1991 | Toyoshima et al. | 162/137 |
| 5,091,247 A * | 2/1992 | Willibey et al. | 442/46 |
| 5,120,905 A | 6/1992 | Cousin et al. | 174/113 C |
| 5,167,352 A | 12/1992 | Robbins | 220/402 |
| 5,240,969 A * | 8/1993 | Brown | 521/125 |
| 5,419,139 A | 5/1995 | Blum et al. | 62/45.1 |
| 5,421,677 A * | 6/1995 | Adam et al. | 405/270 |
| 5,558,245 A * | 9/1996 | White | 137/343 |
| 5,604,266 A | 2/1997 | Mushovic | 521/122 |
| 5,609,299 A * | 3/1997 | Foster et al. | 239/304 |
| 5,610,224 A | 3/1997 | DePue et al. | 524/538 |
| 5,614,575 A * | 3/1997 | Kotschwar | 524/270 |
| 5,700,375 A | 12/1997 | Hagen et al. | 210/651 |
| 5,810,254 A * | 9/1998 | Kropfield | 239/61 |
| 6,602,025 B2 * | 8/2003 | Markusch et al. | 524/589 |
| 6,632,875 B2 * | 10/2003 | Markusch et al. | 524/589 |
| 6,669,407 B2 * | 12/2003 | Markusch et al. | 405/184.2 |
| 6,786,680 B2 * | 9/2004 | Markusch et al. | 428/423.1 |
| 2002/0168531 A1 * | 11/2002 | Markusch et al. | 428/423.1 |
| 2002/0168907 A1 * | 11/2002 | Markusch et al. | 442/86 |

* cited by examiner

POLYURETHANE IN INTIMATE CONTACT WITH FIBROUS MATERIAL

BACKGROUND OF THE INVENTION

1. Field of the Invention

The invention relates in general to a polymeric compositions containing reinforcement fibers, and a process for the preparation thereof, which products are useful for the formulation of reinforced structures, coatings, liners, and the like. The invention is also directed to an apparatus for and a method of spraying this polymeric compositions, both in the form of a film and a foam.

2. Description of Related Art

A strong, durable, high build rate coating with no volatile organic compound (VOC) emissions has been desired as a protective coating for many years. Attempts at producing a coating having those characteristics has resulted in compromising one or several of desired properties. Polyurethane polymers, and coatings made from them, result from the reaction of an isocyanate having an isocyanate terminated compound and a polyol having an hydroxyl terminated compound. Polyurethane foams are typically produced by reaction of the polyisocyanate with the polyol in the presence of a blowing agent. Historically, chlorofluorocarbons such as CFC-11 have been the blowing agents of choice. These agents have been thought to negatively affect the environment and are being phased out of the polyurethane foam manufacture.

Low density coatings, when fabricated, tend to have low toughness or abrasion resistance. Furthermore, most coatings require a significant amount of organic solvent to carry the coating during spraying applications, which contributes significantly to the problem of volatile organic compounds (VOC) emissions. Coating compositions must meet with Occupational Safety and Health Administration and the Environment Protection Agency requirements. Since VOCs are typically toxic, smog-producing and noxious, their continued release can cause a detrimental impact on worker safety and on the environment. Governmental regulations restrict the amounts and types of VOCs which are permitted to escape into the atmosphere from coating compositions, therefore, there should preferably be no amount of organic solvents present in coating compositions.

Thick coatings tend to be spongy or brittle and applying that type of coating to a vertical surface is a slow and tedious process due to slumping problems or curing/out gassing times required. The majority of low VOC coatings available at the present time are only acceptable for thin coating applications (less than 20 mils dry film thickness), or have an exceedingly long dry time between applications which prohibits the successful fabrication of high build rate and/or thick coatings. Another disadvantage associated with many of the products prepared in the prior art having high viscosities is that application by spraying is often precluded.

Polymeric resins containing fillers are known, and are described in U.S. Pat. No. 5,604,266 to Mushovic. Mushovic discloses a polyester-polyurethane resin material mixed with at least a KEVLAR® filler (manufactured by DuPont). The KEVLAR pulp filler is added to the polyol reactant of the polyurethane. The polyurethane mixture of Mushovic was then poured into a mold. Mushovic does not disclose or suggest a sprayable polymeric composition containing reinforcing fibers. In the present invention, polymer compositions containing KEVLAR or other reinforcing fibers can be sprayed, while maintaining homogeneity of the composition, necessary for the spray application. Polymer compositions that can be sprayed are more flexible in the field, they can conform to complex shapes and surface details. In order to spray a polymeric composition comprising a reinforcing fiber, such as KEVLAR, SPECTRA® (owned and manufactured by Allied-Signal, Inc., Delaware, U.S.A.), carbon fullerenes and nanotubes, not only must the composition be mixed properly but also requires a modification be made to the dispensing apparatus, i.e. the spray gun. U.S. Pat. No. 4,857,569 to Cotts et al., discloses a polymer alloy composition prepared by intimately mixing one or more polyurethane components with selected reinforcing amounts of rod-like aromatic polyamide components (e.g. KEVLAR). However, the compositions of Cotts must be formed either by blending two individual solutions of the polyurethane and rod-like polyamide components in a common or mutually compatible solvent, or by polymerizing the polyurethane components in a solvent, which is itself a solution of the rod-like polyamide component in a suitable solvent. Thus, the KEVLAR reinforcing fiber must be dissolved in a solvent, e.g., a solution of polyparaphenyleneterephthalamide. U.S. Pat. Nos. 4,599,401; 4,629,779; 4,707,535; and 4,725,653 to Koleske; U.S. Pat. No. 4,857,579 to Domeier and U.S. Pat. No. 4,233,205 to O'Connor disclose polyurethane elastomers or other polyurethane products containing KEVLAR fibers. U.S. Pat. No. 5,610,224 to DePue et al., discloses an elastic and high strength material formed from polyurethane and aromatic polyamide. Japanese Patent 53-34884 to Masanobu et al., discloses a composite material prepared by curing and bonding an aromatic polyamide fiber and a thermosetting resin with a specific lactam compound and an isocyanate compound.

A hybrid liner is described in U.S. Pat. No. 4,956,397 to Rogowski et al., which describes an insulating solid rocket liner made from polyurethane rubber and KEVLAR pulp or fibers, specifically fibrillated fibers. U.S. Pat. Nos. 4,034,138 and 4,095,404 to Babayan and U.S. Pat. No. 5,120,905 to Cousin et al., all disclose polyurethane material impregnated or coated with aromatic polyamide fibers. U.S. Pat. No. 5,167,352 to Robbins and U.S. Pat. No. 5,419,139 to Blum et al., both disclose a double wall tank system or a composite cryogenic tank coated or lined with polyurethane and KEVLAR. Blum specifically discloses a tank lined with a laminate of film layers, each having a vacuum deposited metalized coating.

A problem associated with adding a reinforcing fiber, such as KEVLAR, to a polyurethane resin solution has been that the fibers separate out from the polyurethane reaction components, or deteriorate because of the solvents or catalysts in the reaction components, making it impossible to exhibit the intended properties and strength and stability of the added reinforcing fibers. Accordingly, it has conventionally been necessary to agitate the reaction components so as to be uniformly mixed and dispersed, before its use, i.e., before the polyisocyanate and polyol components are mixed together to cause the reaction. Thus, polyurethane resin formed from conventional polyurethane reaction components containing reinforcing fibers cannot be sprayed.

Conventional spray gun assemblies have spring loaded check valves for restricting the flow of two-part reactive polymers. See FIGS. 1 and 2. U.S. Pat. No. 5,810,254 to Kropfield, which describes two premixing chambers, that receive the polymer reaction components, each chamber having an actuating valve for controlling the flow of the components through the premixing chambers. Since two part polyurethanes require a very specific percentage ratio of the two material components, any significant variation will not produce a polyurethane with the desired cure effectively or quickly, and may not have the desired durability.

The ideal polymer for use as a coating or liner would contain reinforcing fibers and other fillers that could be sprayed, would be easy to use, quick to activate, and have a long service life. Polymers that do not have any volatile organic content and do not leak hazardous materials, having zero toxicity, are also necessary for use in coatings and liners. New methods for greatly reducing or eliminating VOCs during the application of such coatings are urgently needed to prevent worker injury and comply with current and pending environmental regulations. Also of great importance is the cost, performance and durability of such polymer formulations. Currently, there does not exist a method of making a polymer composition that satisfies all these criteria.

BRIEF SUMMARY OF THE INVENTION

The present invention provides a solvent-free, sprayable polymeric material and a process for preparing a polymer with a fibrous material by providing a predetermined amount of fibrous material, providing reaction components comprising a polyol and an isocyanate, or a combination of a polyurethane with a polyurea, polyester, or epoxy, heating the reaction components, adding the fibrous material to the polyol component, the isocyanate component, or both, and then reacting the reaction components. Another embodiment of the present invention provides a restriction free spray nozzle for mixing and spraying a first reactive polymeric material with a second reactive polymeric material, at least one of the reactive polymeric materials containing a fibrous material, so as to form a two part polymer, the nozzle comprising: a restriction free check valve without springs, a hose for conveying first and second polymeric materials to a ball valve, the nozzle spraying a mixture of the first and second materials from the check valve onto a surface. The nozzle has a large diameter tip of about 0.21-0.45 Thousands (thousands of an inch). A mixture of the first and second materials goes through a mixing block and through a static mixer through the nozzle and onto a surface. Another embodiment of the present invention provides a reinforced structure and a method of making the structure. The structure comprises a first and second layer of polyurethane resin containing from about 0.5 to 30% by weight of a fibrous material sandwiching a layer of polyurethane foam containing from about 0.5 to 30% by weight of a fibrous material. A further embodiment of the present invention provides a flexible liner which comprises a porous geotextile fabric, a polyurethane composition comprising a fibrous material sprayed over the geotextile fabric, forming a monolithic membrane with the geotextile fabric.

The products of the present invention are applicable to building elements and articles of manufacture, in particular composite building materials, e.g., coated panel boards, which are lightweight, or as geotextile liners used to line land fills, or for lining/relining pipes. Liners of the present invention have a substantially fluid-tight or leak proof construction, which gives them various useful applications such as improved enclosures for fluid-confining means. Thus, the reinforced fiber polyurethane of the present invention would also have application in the wastewater industry, where polyurethanes have been used extensively since the 1970's. The properties of polyurethanes that are amenable to use in the potable water, hazardous waste, chemical and wastewater industries are their impermeability, resistance to microbial attack, excellent adhesion and abrasion resistance, flexibility, and unlimited film build. Objects made of steel, iron, plastics and concrete, or objects previously lined with other coatings, may be lined while maintaining the advantageous properties of the polymer, e.g., polyurethanes.

The composition of the present invention can be sprayed onto a variety of surfaces to provide abrasion and corrosion resistance, the seamless coating being resistant to many corrosion causing chemicals. Since there is no solvent to evaporate, several cost and time saving advantages accrue. Sandblasting surface preparation of the surface to be coated is avoided, thus, requiring less work, expense and time before application and eliminating waste disposal of the surface preparation materials and any prior coating that was removed. The compositions allow greater thickness per pass, typically 30-40 mils, (solvent systems typically achieve about 4 up to 20 mils), no time lag between coats (solvent systems tend to run); much shorter tack-free times; no inflammable or toxic solvent hazards; no solvent attack on sensitive surfaces; and good adhesion to various substrates. The composition is sprayable at temperatures of about 240° F. and above, preferably 140° F. and is easily mixed. Moreover, it was unexpectanly found that the coating comprising KEVLAR reinforced fibers was sandable and, thus, easily repairable.

Foam having reinforced fiber can be used to seal cracks. If the crack already has water in it, the reinforced resin (without adding water) can be sprayed into the crack, react with the water in the crack, creating a foam. Thus, the composition can be applied in concrete reservoirs and parking lots to fill cracks.

It was discovered that polymeric compositions and products coated with the composition did not have the problems associated with conventionally coated products, such as blistering and leaching of volatile organic compounds. Blisters appear in conventional polymer coatings as raised, localized swellings of the coating, often occur after immersion in liquids, and a viscous acidic liquid is expelled when ruptured. The coating of the present invention solves this problem because it lacks VOCs.

The composition of the present invention can also be used to manufacture pipes. Water flowing inside pipes made with the composition of the present invention, comprising KEVLAR, do not have their water flow drag/friction affected by the KEVLAR fibers contained in the composition. Reinforced polyurethane pipes have greater strength and are able to withstand increased, otherwise bursting, pressure. The lower friction inside the pipes decreases costs to supply water to homes.

Compositions containing specific reinforcing fibers may be used in applications requiring the properties provided by those fibers and the polymeric composition. For example, ceramic and carbon fibers combined with polyurethane compositions can be used in applications requiring control of thermal expansion.

Theses and other features, aspects, and advantages of the present invention will become better understood with regard to the following detailed description, appended claims, and accompanying drawings.

DETAILED DESCRIPTION OF THE INVENTION

Figure 1:
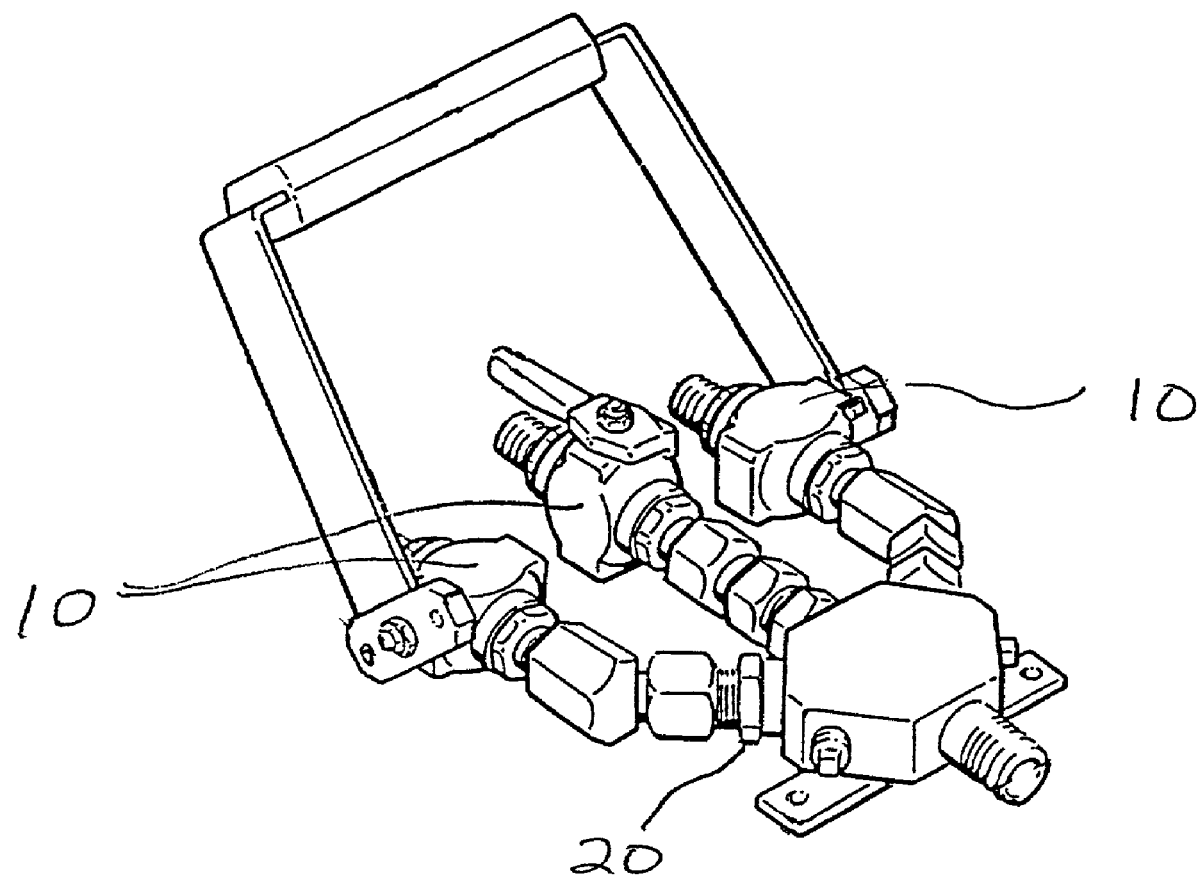
FIG. 1 is a perspective view of a mixing block of the prior art.
Figure 2:
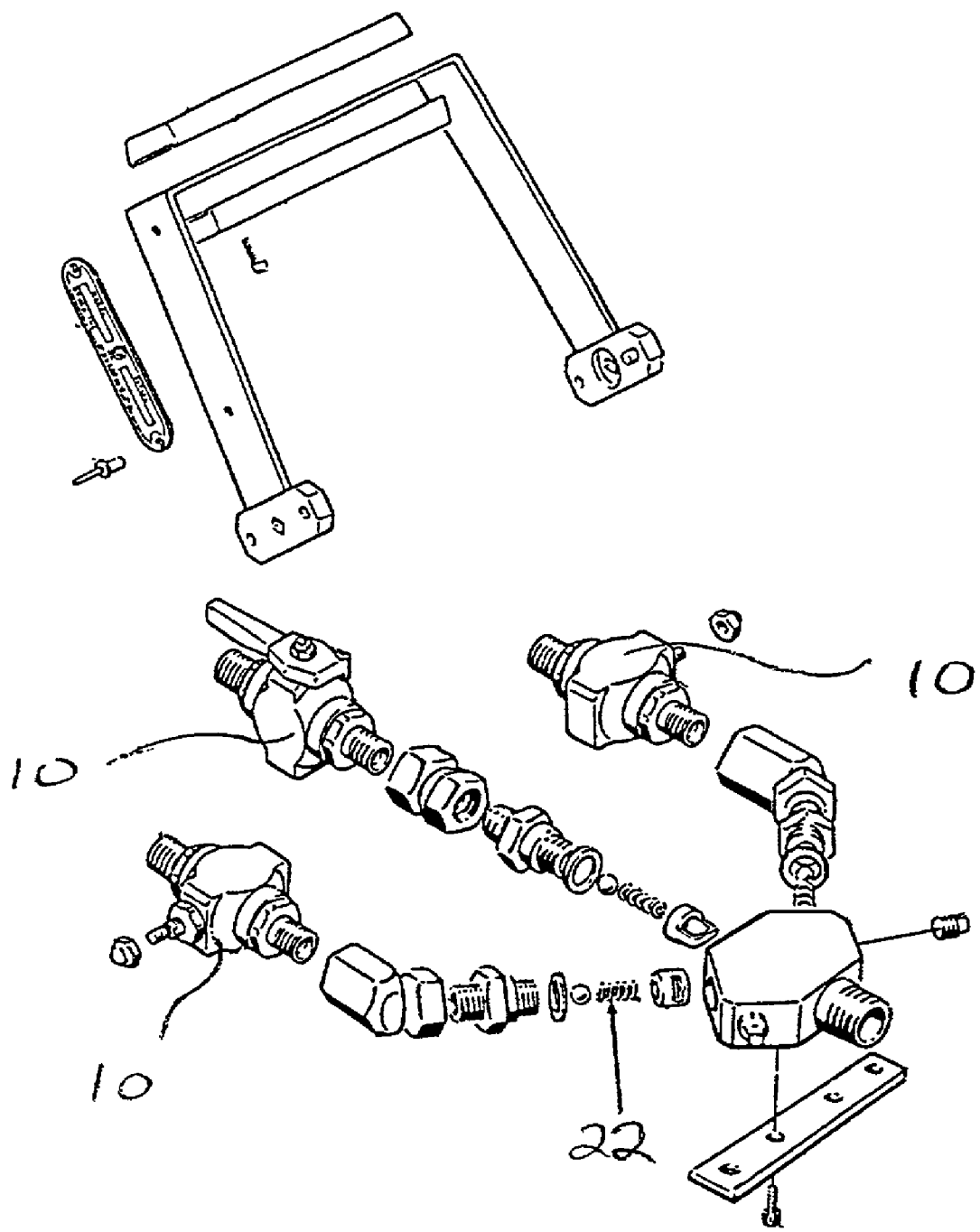
FIG. 2 is an exploded perspective view of the mixing block of FIG. 1, showing the elements thereof in greater detail.

Any of the polyols used in the art to prepare polyurethanes and polyurea-containing polyurethanes or mixtures thereof can be used, for example: a polyol chosen from a variety of —OH terminated polyethers such as the polyoxyalkylene polyols having 2-4 hydroxyl groups and where the alkylene group has 2-6 carbon atoms, obtained by polymerization of an alkylene oxide, such as ethylene oxide, propylene oxide, or butylene oxide, with a glycol; polyethers having higher functionality obtained by reaction with a triol or higher polyol, such as glycerine, trimethylolpropane, and pentaerythritol; and polypropylene-oxide triol, having a preferable molecular weight range of about 300 to 20,000, most preferably 500 to 5000; and aromatic or aliphatic amine-based polyols, and sorbitol based polyether polyols.

The isocyanate component of the polymeric composition may be a diisocyanate or a polyisocyanate. While any suitable polyisocyanate can be used in the foam-making process, readily available industrial polyisocyanates are particularly preferred. Various elastomeric polyurethanes are available from Prime Coatings Incorporated, located in Huntington Beach, U.S.A., under the trademark Utilithane-1600. Other examples of suitable diisocyanates and polyisocyanates useful for making polyurethane foams comprise aromatic, aliphatic and cycloaliphatic polyisocyanates, among others. Representative members of these compounds comprise diisocyantes such as 4,4'-Diphenylmethane-diisocyanate, hexamethylene diisocyanate; m-xylylene diisocyanate; toluene diisocyanate and/or any of its isomers such as 2.4-toluene diisocyanate or commercially available blends of the 2,4- and 2,6-isomers such as the 80:20 and 65:35 blends; polymethylene polyphenylisocyanate; m-phenylene diisocynate; p-phenylene diisocyanate; 3,3'-dimethyl-4,4'-diphenyl diisocyanate; methylenebis (2-methyl-p-phenylene) diisocyanate; 3,3'-dimethoxy-4,4'-biphenylene diisocyanate; 2,2'4,4'-tetramethyl-4,4'-biphenylene diisocyanate; 3,3'-dimethyl-4,4'-diphenylmethane diisocyanate; 4,4'-diphenylisopropylidene diisocyanate; 1,5'-naphthylene diisocyanate; and polymethylene polyphenylisocyanate. The ratio of equivalents of isocyanates, side A components, to polyols, side B components is from about 10 to 1 by volume, preferably from about 3 to 1, most preferably from about 1 to 1.

The structure of KEVLAR is unique in that it is an organic fiber that is crystalline with a high degree of orientation. KEVLAR pulp is produced by fracturing this crystalline structure. Pulp products are very short, highly fibrillated fibers. The amount of KEVLAR used is based on its total weight percent of the polymeric composition (the mixture of component/side A and component/side B reagents), and is preferably added in the amount of about 0.50 weight % to 30 weight % of the total weight percent of the polymeric composition, preferably about 0.50 weight % to 1.00 weight %, most preferably about 0.50 weight % to 0.75 weight %, for applications using a spray gun. The amount of added reinforcing fiber, e.g., KEVLAR, may be easily increased for hand applications and the higher end of the previously disclosed range may be used, e.g., about 30 weight %. If the KEVLAR is separately added to component A and component B, the KEVLAR added to component A plus the KEVLAR added to component B is about 0.50 weight % to 30 weight % of the total weight percent of the polymeric composition, preferably about 0.50 weight % to 0.75 weight %. When the KEVLAR is added to both components A and B, it is preferably added to component A in an equal weight percent amounts to that added to component B. However any amount may be added to the components individually as long as the total amount of KEVLAR added is about 0.50 weight % to 30 weight % of the total weight percent of the polymeric composition. Other fibers could be used to substitute for the KEVLAR, such as SPECTRA, glass and ceramic fibers, carbon fullerenes, and carbon nanotubes and can be added in the same amounts. Thus, a polymeric composition in accordance with the present invention can include fibrous material such as an aramid, polyethylene, fullerene, nanotube, ceramic fiber, or mixtures thereof.

Catalysts can be added which promote the formation of polyurethane by reaction of the isocyanate groups and hydroxy groups. For example, amine compounds, such as triethanolamine, triethylenediamine, N-methylmorpholine, tetramethyl-1,4-butanediamine, N-methylpiperazine, dimethylethanolamine, and diethylethanolamine, triethylamine; and organometallic compounds, such as stannous octanoate, dibutyltin dilaurate, and dibutyltin di-2-ethylhexanoate. These catalysts may be used alone or in combination with one another. Amounts used are 1:1-10:1 by weight ratio of the catalyst: polymeric composition inclusive of the reinforcing fibers.

It is often desirable to employ minor amounts of certain other compounds in preparing the polymer composition, such as: one or more catalysts, surfactants, fire retardants, preservatives, pigments (including titanium or aluminum dioxide, and high UV absorbing ultra-fine titanium dioxide), antioxidants, anti-microbial agents, filler, and anti-static agents, powdered tungstun. Amounts used can be up to 25% by volume of the total weight of the polymer composition.

Spraying the polymeric film/foam compositions of the present invention begins when the fibrous material is pre-weighed to the total weight of polymeric composition (e.g., the polyurethane) desired, as discussed above. It is preferable to use fibrous material that is dry, such as by heating it to a temperature of from about 140° to 160° F., prior to adding the fibrous material to the reaction components A and/or B. Component A and B are heated to a temperature of about 160° F. to 250° F. About 10 Volume % of Component A is added with the pre-weighed fibrous material, or 10 Volume % of Component B is added to the pre-weighed fibrous material, or both components are added/blended with the predetermined total weight % of the fibrous material for about fifteen minutes under anhydrous conditions, preferably under an inert atmosphere such as a nitrogen blanket. The adding of the fibrous material to the polyol, the isocyanate, or both, is such that the fibrous material is mixed randomly within the polyol, the isocyanate, or both. The separate components, one or both of which contain the fibrous material are packaged under anhydrous conditions, preferably under an inert atmosphere such as a nitrogen blanket, until ready for use/application. If the composition of the present invention is sprayed in multiple applications, it is preferable to follow the first application while it is still in a soft liquid phase, whereby to allow the polymer to cross-link, enabling the fibrous material to embed in both the layer of the first application and any following applications.

Figure 3:
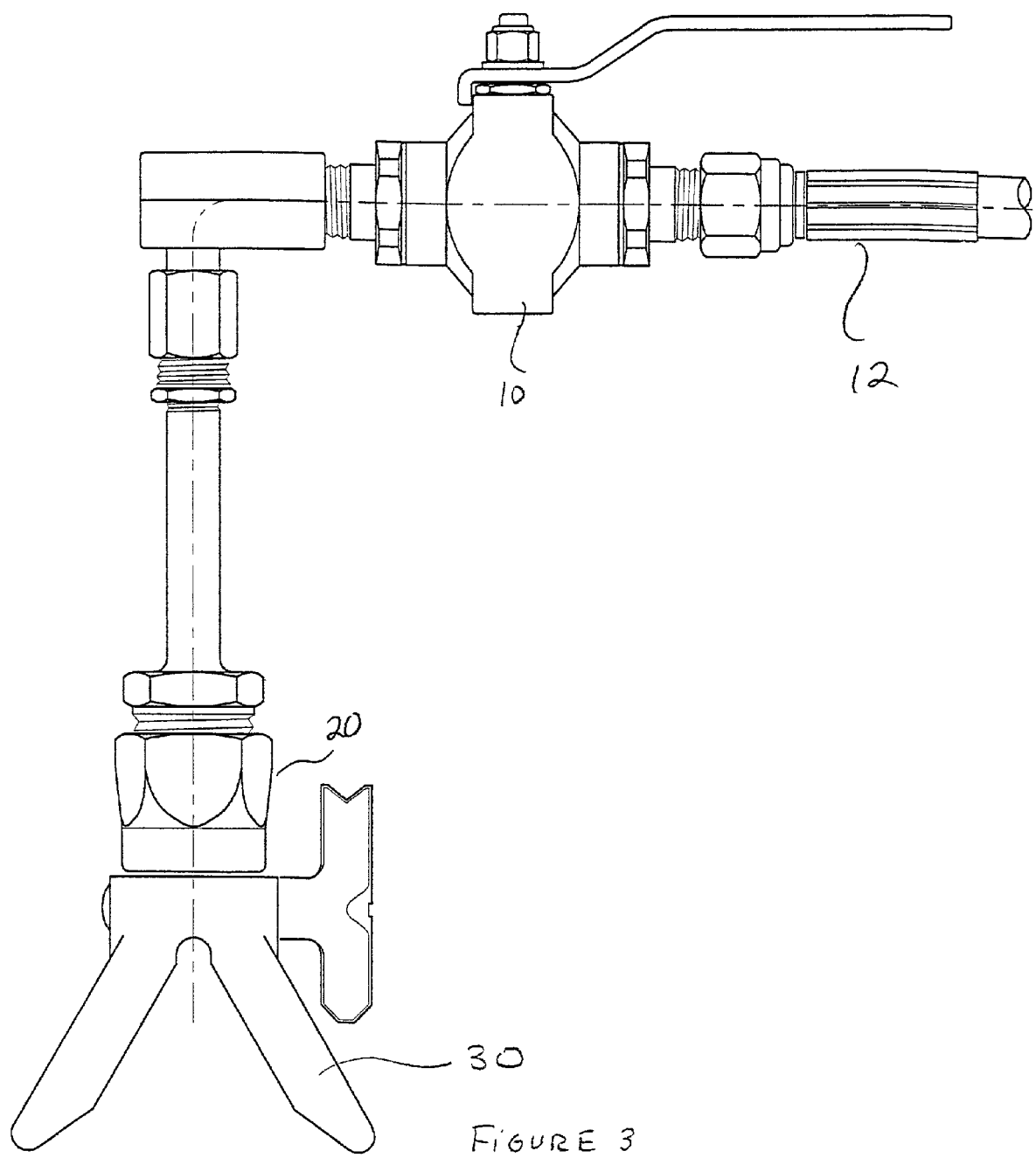
FIG. 3 is an elevational view of the restriction free spray nozzle of the present invention.

Application of the polymeric composition begins when component A reagent is supplied by pump to a metering unit, or a metering pump. Component B containing polyol, catalysts, or surfactants is then prepared according to a defined formulation in a mix tank. Either or both component A or B contains the fibrous material. Any additional blowing agents, e.g. water or an alcohol/water mixture may be either added to component B, prior to its reaction with component A, or may be added to the mixture of component A and component B. Component B is also supplied by pump to a metering unit, or a metering pump. The metering pumps boost the pressure generally to 2000 to 2500 psi and control the flow of components A and B to a precise ratio as determined by the desired chemistry. The ratio of isocyanates, side A components, to polyols, side B components is from about 10 to 1 by volume, preferably from about 3 to 1, most preferably from about 1 to 1. The pumps deliver components A and B to at least one mixing block. Inside the mixing block, components A and B are statically mixed at high pressure, which results in intimate mixing of the components. The mixed components travel through an input hose (12) to the ball valve (10) through the restriction free check valve (20), a check valve without the spring (22) of the prior art check valve, through the spray tip (30), seen in FIG. 3. The pot life or working time of the mixed polymeric composition is variable, but is typically short. The mixed chemicals begin to react in about 3 seconds following mixing and completing reaction in about 3-30 minutes.

The polymeric composition of the present invention may be sprayed in any thickness, typically of about 2000 mils to 10 mils in one application, depending on the project needs. The polymeric foam of the present invention can be sprayed into a mold, either in normal atmospheric conditions or under 2-3 atm of pressure.

The geotextile fabric is porous such that the polyurethane can fill in the pores and it becomes one-layer.

Surface Preparation

Conventional coating processes require expensive and labor intensive surface preparation. For example, steel surfaces typically require abrasive sand blast cleaning to near white, which necessitates expensive removal of oftentimes hazardous materials. However, the present invention requires little or no surface preparation. Deteriorated concrete surfaces should be prepared by high-pressure water blasting to a sound concrete surface that is free of oil, grease, or existing coatings.

The following examples are given to illustrate the invention.

EXAMPLE 1

KEVLAR was pre-weighed to the 0.75 weight percent of the total weight desired of the final polyurethane material. The side A reaction component, a diisocyanate (4,4' Diphenylmetane-diisocyanate) and the side B reaction component, a blend of hydroxy-terminated polyols found in Utilithane 1600 manufactured by Prime Coatings, Inc., Huntington Beach, U.S.A., were heated to a temperature of about 160° F. Under an inert atmosphere of nitrogen, ten percent by volume of the diisocyanate was added to and mixed for about fifteen (15) minutes with the pre-weighed KEVLAR pulp, in order to wet the KEVLAR fibers. The remaining amount of the diisocyanate was added to the diisocyanate containing the pre-wetted KEVLAR fibers, and was mixed for about thirty (30) minutes under an inert atmosphere of nitrogen. The remaining amount of polyol was added to the polyol containing the pre-wetted KEVLAR fibers, and was also mixed for about thirty (30) minutes under an inert atmosphere of nitrogen. The diisocyanate and polyol containing KEVLAR were packaged separately under an inert atmosphere of nitrogen until needed for application. The diisocyanate and the polyol were in an about 1:1 ratio by volume.

EXAMPLE 2

The procedures of Example 1 were followed substituting 1.0 weight % KEVLAR pulp for the 0.75 weight %.

EXAMPLE 3

The procedures of Example 1 were followed substituting bringing the temperatures of the diisocyanate and polyol reagents to about 250° F., prior to adding the pre-weighed KEVLAR pulp.

EXAMPLE 4

The procedures of Example 1 were followed adding the step of dry-heating the pre-weighed KEVLAR pump to a temperature of about 160° F., prior to adding to the 10% diisocyanate and polyol reagents.

EXAMPLE 5-8

The procedures of Example 1 can be followed by substituting, respectively, about 0.5 to 0.75 weight % of the following: high molecular weight polyethylene fibers, such as SPECTRA fibers; fullerenes; nanotubes; ceramic fiber, for the KEVLAR pulp fibers.

EXAMPLE 9

The procedures of Example 1 were followed substituting 30 weight % KEVLAR for the 0.75 weight % KEVLAR.

EXAMPLE 10

The procedures of Example 1 were followed by substituting the step of adding the pre-weighed KEVLAR pulp to 100% of the diisocyanate and polyol reagents and blending for about thirty (30) minutes, for the steps of adding the KEVLAR to ten (10) % of the diisocyanate and polyol reagents.

EXAMPLE 11

The procedures of Example 1 were followed by substituting the step of adding the pre-weighed KEVLAR pulp to ten % of the diisocyanate reagent only, for the step of adding the pre-weighed KEVLAR pulp to ten % of the diisocyanate and ten % of the polyol reagents.

EXAMPLE 12

The procedures of Example 1 were followed by substituting the step of adding the pre-weighed KEVLAR pulp to ten % of the polyol reagent only, for the step of adding the pre-weighed KEVLAR pulp to ten % of the diisocyanate and ten % of the polyol reagents.

EXAMPLE 13

The diisocyanate and polyol reagents containing KEVLAR made from the procedures of Example 1 were followed to create the polyurethane foam containing KEVLAR of the present invention. A predetermined amount of water (e.g., 0.5% by volume) was added to the polyol reaction component, creating a foam. The predetermined amount depends on the needed density of the resulting foam.

EXAMPLE 14

The procedures of Example 13 can be followed substituting the step of adding water to the polyol reaction component for the step of injecting water as a third component, before the mixer, at an equal pressure to the two other reagents (the polyol and the isocyanate).

EXAMPLE 15

A porous geotextile sheet of about 1/8" to 3/16" manufactured by Geotextile was used to line a concrete surface. The concrete surface was prepared by pressure wash. The KEVLAR containing polyurethane film of the present invention was sprayed onto the porous geotextile mat which formed a monolithic membrane with the geotextile mat. The perimeter edges of the sheet were sprayed with the polyurethane to attach the sheet to the surface.

EXAMPLE 16

A method of applying the composition of the present invention to line an old tank concrete was carried out. The surface of the tank was prepared by pressure washing (<1000 psi) with water to clean the surface. A thin layer of about 20 mils of polyurethane without the reinforcing fiber was sprayed onto the tank surface, which served to seal in volatile organic compounds leaking from the previous liner. The diisocyanate composition containing 1.00 weight % KEVLAR was supplied by pump to a metering pump. The polyol composition containing 1.00 weight % KEVLAR was also supplied by pump to a metering pump. The metering pumps boosted the pressure to about 2000 to 2500 psi and controlled the flow of the diisocyanate and polyol to a ratio of about 1:1. The pumps delivered the diisocyanate and polyol containing KEVLAR to at least one foam/film mixhead. Inside the mixhead, the Components A (diisocyanate) and B (polyol) were impinged against each other at high pressure, which resulted in intimate mixing of the components, forming a sprayable polyurethane containing KEVLAR. The polyurethane containing KEVLAR was then sprayed in a single application over the tacky underlying layer of about 20 mils, thereby fusing with the underlying layer. The polyurethane layer containing the KEVLAR was applied in a coating of about 100 mils.

EXAMPLE 17

A reinforced polymeric panel was manufactured. A sheet of polyethylene was laid down in a container. 20 mils of the composition made in Example 1 was sprayed on top of the polyethylene sheet, while still tacky (about 1 minute), a polyurethane foam of Example 13 was sprayed at about 20 to 100 mils. The foam was sprayed while the resin layer was still tacky so that the polyurethane layers cross-linked and the KEVLAR fibers contained in both the resin and foam, embedded within both layers. The polyethylene sheet was removed (peeled off) and the panel was planed.

EXAMPLE 18

A reinforced construction panel was made by spraying a layer of polyurethane (as described in Example 1) in a mold 20-2000 mils thick, while it was still tacky (about 3 minutes) the polyurethane foam of Example 13 was sprayed at a predetermined thickness. Thickness is dependent on the application of the panel are there are no limits to how thick to spray the foam. The polyurethane resin material contained KEVLAR, and was sprayed on both the top and bottom sides of the panel.

EXAMPLE 19

The panels of Example 17 and 18 can be pre-threaded for future use in attaching the panels to other objects. A fastener is attached to the polyurethane layer prior to spraying the polyurethane foam. Spraying the polyurethane foam. After the foam is set, the fastener is removed, leaving a hole of a predetermined diameter, for use subsequent attachment of the panel.

EXAMPLE 20

Pipes can be made of the polymeric resin of Example 1. A mold of predetermined length and diameter is placed on a lathe. A hose can be suspended above the lathe and mold and to run parallel to the length of the mold. The hose either can have predetermined spaced spay tips for allowing the polymeric material to be sprayed or can have at least one spray tip which is moved above and along the length of the mold. The polymeric material of Example 1 can be sprayed through the spray tips, for a predetermined amount of time while the mold is spun on the lathe to form a pipe of predetermined thickness.

The following references are incorporated herein by reference: U.S. Pat. No. 5,604,266 to Mushovic; Cotts et al. U.S. Pat. No. 4,857,569; U.S. Pat. Nos. 4,599,401; 4,629,779; 4,707,535; and 4,725,653 to Koleske; U.S. Pat. No. 4,857,579 to Domeier; U.S. Pat. No. 4,233,205 to O'Connor; U.S. Pat. No. 5,610,224 to DePue et al.; Japanese Patent 53-34884 to Masanobu et al.; U.S. Pat. No. 4,956,397 to Rogowski et al.; U.S. Pat. Nos. 4,034,138 and 4,095,404 to Babayan; U.S. Pat. No. 5,120,905 to Cousin et al.; U.S. Pat. No. 5,167,352 to Robbins; U.S. Pat. No. 5,419,139 to Blum et al.; and U.S. Pat. No. 5,810,254 to Kropfield.

Although the foregoing invention has been described in some detail by way of illustration and example for purposes of clarity and understanding, it will be obvious that various modifications and changes which are within the knowledge of those skilled in the art are considered to fall within the scope of the appended claims.

The invention claimed is:

1. A device for mixing and spraying a first polymerization reactant material with a second polymerization reactant material, at least one of the polymerization reactant materials containing a fibrous material, comprising: a mixing block, a spray nozzle having a tip with an inner diameter of about 0.21 to 0.45 thousandths of an inch and having a check valve without a spring or springs, a hose for conveying said first and second polymerization materials from the mixing block to a ball valve, said device being capable of spraying a mixture of the first and second polymerization materials from said spray nozzle onto a surface.

2. The device of claim 1 wherein the fibrous material is an aramid, polyethylene, fullerene, nanotube, ceramic fiber, or mixtures thereof.

3. The device 2, wherein the aramid fiber is aramid fiber pulp.

4. A device for mixing and spraying a first polymerization reactant material with a second polymerization reactant material, at least one of the polymerization reactant materials containing a fibrous material, comprising: a mixing block, a spray nozzle having a tip with an inner diameter of 0.21 to 0.45 thousands of an inch and having a check valve without a spring or springs, a hose for conveying said first and second polymerization materials from the mixing block to a ball valve, said device being capable of spraying a mixture of the first and second polymerization materials from said spray nozzle onto a surface.

* * * * *